US011456781B1

(12) United States Patent
Millanes-Ruiz

(10) Patent No.: US 11,456,781 B1
(45) Date of Patent: Sep. 27, 2022

(54) EMBEDDED ANTENNA AND RELATED MIMO SYSTEM

(71) Applicant: 2J ANTENNAS USA, CORPORATION, Gilbert, AZ (US)

(72) Inventor: Ricardo Antonio Millanes-Ruiz, Gilbert, AZ (US)

(73) Assignee: 2J ANTENNAS USA, CORPORATION

( * ) Notice: Subject to any disclaimer, the term of this patent is extended or adjusted under 35 U.S.C. 154(b) by 0 days.

(21) Appl. No.: 17/555,087

(22) Filed: Dec. 17, 2021

(51) Int. Cl.
*H04B 7/0413* (2017.01)

(52) U.S. Cl.
CPC .................. *H04B 7/0413* (2013.01)

(58) Field of Classification Search
CPC ........ H04B 7/0413; H01Q 21/06; H01Q 9/40; H01Q 21/00
See application file for complete search history.

(56) References Cited

U.S. PATENT DOCUMENTS

2007/0024503 A1* 2/2007 Tsai .................. H01Q 1/38
343/795

* cited by examiner

*Primary Examiner* — Rahel Guarino
(74) *Attorney, Agent, or Firm* — CP Law Group PC; Cy Bates

(57) ABSTRACT

The disclosure concerns an embedded antenna having alternating polarization resonators. The embedded antenna includes a substrate, a first antenna radiator, and a second antenna radiator. The substrate has a first surface and a second surface opposite the first surface. The first antenna radiator and second antenna radiator are each disposed on the first surface. The first antenna radiator has a first length extending along the substrate and further includes a first minor radiator element and a second minor radiator element disposed on each terminal end of the first length. The second antenna radiator has a second length wherein the second length is less than the first length. Additionally, the first length and the second antenna radiator comprise a parallel orientation. In some embodiments, the embedded antenna further includes a third antenna radiator and a fourth antenna radiator where each is disposed on the second side.

18 Claims, 8 Drawing Sheets

EMBEDDED ANTENNA AND RELATED MIMO SYSTEM

BACKGROUND

Field of the Invention

This invention relates to an embedded antenna; more particularly, to embedded antennas comprising alternating polarization resonators.

Description of the Related Art

Long Term Evolution (LTE) embedded antenna designs involve a balancing of competing design parameters of performance and size where the smaller embedded antennas generally have worse performance as compared to larger antennas which are otherwise equivalent. A low efficiency and low gain of an antenna can jeopardize certification standards in North America and other countries where minimum requirements can be challenging to pass.

There exists a need for an embedded antenna which has a wide bandwidth and better performance while maintaining a relatively small footprint compared to typical embedded antennas in the market.

SUMMARY

The disclosure concerns embedded antennas comprising alternating polarization resonators. The embedded antenna comprises a substrate, a first antenna radiator, and a second antenna radiator. The substrate has a first surface and a second surface opposite the first surface. The first antenna radiator and second antenna radiator are each disposed on the first surface. The first antenna radiator has a first length extending along the substrate and further includes a first minor radiator element and a second minor radiator element disposed on each terminal end of the first length. The second antenna radiator has a second length wherein the second length is less than the first length. Additionally, the first length and the second antenna radiator comprise a parallel orientation.

The embedded antennas can improve energy conservation while seamlessly shift from a positive to negative resonator while maintaining a small form factor.

Other advantages and benefits may be further appreciated from the appended detailed descriptions.

BRIEF DESCRIPTION OF THE DRAWINGS

Other features, combinations, and embodiments will be appreciated by one having the ordinary level of skill in the art of antenna design upon a thorough review of the following details and descriptions, particularly when reviewed in conjunction with the drawings, wherein.

DETAILED DESCRIPTION

Figure 1:
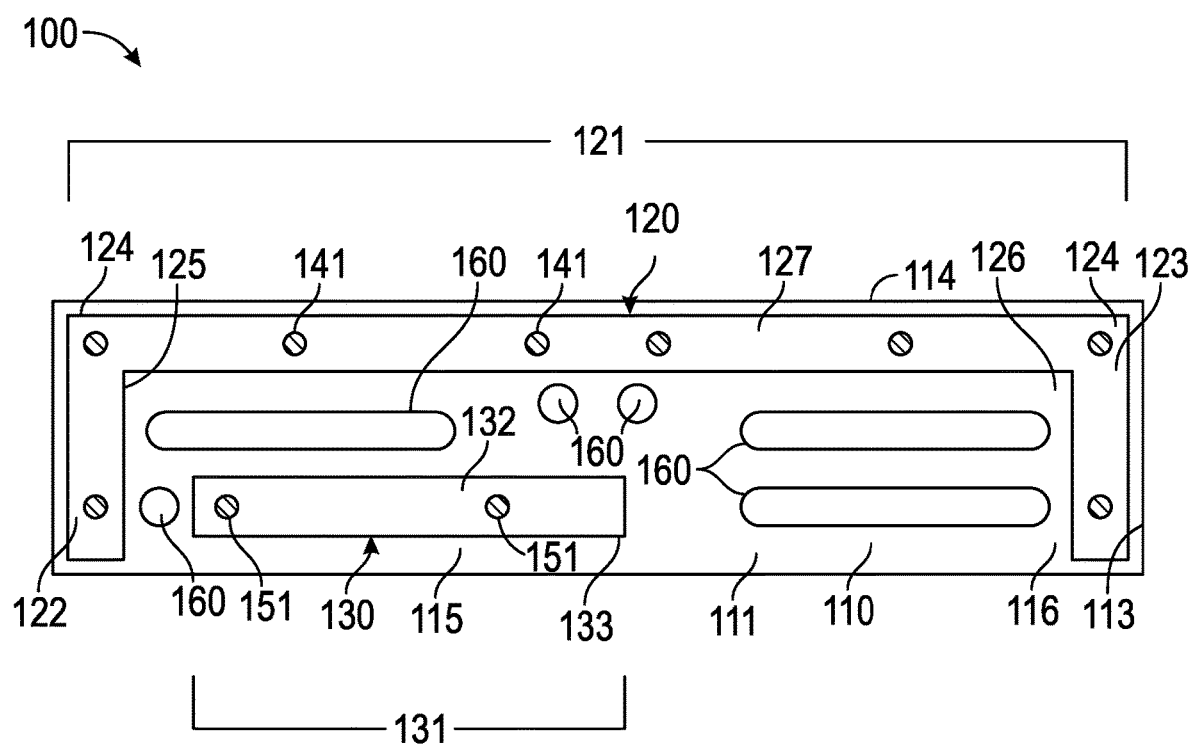
FIG. 1 shows a top view of an embedded antenna in accordance with a first illustrated embodiment.

For purposes of explanation and not limitation, details and descriptions of certain preferred embodiments are hereinafter provided such that one having ordinary skill in the art may be enabled to make and use the invention. These details and descriptions are representative only of certain preferred embodiments, however, a myriad of other embodiments which will not be expressly described will be readily understood by one having skill in the art upon a thorough review of the instant disclosure. Accordingly, any reviewer of the instant disclosure should interpret the scope of the invention only by the claims, as such scope is not intended to be limited by the embodiments described and illustrated herein.

For purposes herein, the term "MIMO" means Multiple Input Multiple Output.

The term "substrate" means a flat or nearly flat surface that contains a conducting portion and can be used a holder of surface mount antennas.

The term "perimeter" means a continuous line or region that forms the boundary of a geometric shape.

The term "antenna radiator" means a conducting element of an antenna that is electrically connected to a radio receiver and/or a radio transmitter and which transmits and/or receives radio waves.

The term "embedded antenna" means a metallic conductor embedded in a dielectric material.

The term "mirrored" means an object that is identical in form to another, but with the structure reversed.

Unless explicitly defined herein, terms are to be construed in accordance with the plain and ordinary meaning as would be appreciated by one having skill in the art.

General Description of Embodiments

In a first embodiment, an embedded antenna is disclosed. The embedded antenna comprises a substrate having a first surface and a second surface opposite the first surface. The substrate further comprises a minor side and a major side. The embedded antenna comprises a first, second, third, and fourth antenna radiators. The first antenna radiator is disposed on the first surface, and has a first length extending along the major side. The first length comprises a first minor radiator element and a second minor radiator element disposed on each terminal end of the first length. The second antenna radiator is disposed on the first surface where the second antenna radiator has a second length wherein the second length is less than the first length. The third antenna radiator is disposed on the second surface and is electrically coupled to the first antenna radiator by a first plurality of vias. The fourth antenna radiator is disposed on the second surface, And is electrically coupled to the second antenna radiator by a second plurality of vias. In such a configuration, the first length of the first antenna radiator and the second antenna radiator comprises a parallel orientation.

The first embodiment may comprise one or more apertures disposed on the substrate. At least one of the one or more apertures may be disposed between the first and second antenna radiators.

The first embodiment may further comprise a mounting circuit board coupled to the second surface. The mounting circuit board may comprise a clearance zone and a ground plane wherein the clearance zone is disposed between the embedded antenna and the ground plane.

In some embodiments, the substrate may further comprise a first half and a second half, wherein the second plurality of vias is disposed entirely on the first half.

In a second embodiment, an embedded antenna is disclosed. The embedded antenna comprises a substrate having a first surface and a second surface opposite the first surface. The substrate further comprises a minor side and a major side. A first antenna radiator is disposed on the first surface, where the first antenna radiator has a first length extending along the major side. The first length comprises a first minor radiator element and a second minor radiator element disposed on each terminal end of the first length. A second antenna radiator is disposed on the first surface where the second antenna radiator has a second length. The second length is less than the first length. The first length and the second antenna radiator comprise a parallel orientation.

Generally, the embedded antenna may further comprise a third antenna radiator and a fourth antenna radiator. The third antenna radiator is disposed on the second surface and can be electrically coupled to the first antenna radiator by a first plurality of vias. The fourth antenna radiator is disposed on the second surface and can be electrically coupled by a second plurality of vias.

The second embodiment may further comprise a substrate having a first half and a second half, wherein the second plurality of vias is disposed entirely on the first half.

In some embodiments, the embedded antenna may further comprise one or more apertures disposed on the substrate. One or more apertures may be disposed between the first and second antenna radiators.

In some embodiments, the embedded antenna may further comprise a mounting circuit board coupled to the second surface, the mounting circuit board comprising a clearance zone and a ground plane wherein the clearance zone is disposed between the embedded antenna and the ground plane.

In a third embodiment a MIMO antenna system is disclosed. The MIMO antenna system comprises a system substrate comprising a perimeter and a center portion. The perimeter comprises a clearance zone and the center portion comprises a ground plane. The MIMO antenna system further comprises a plurality of embedded antennas disposed along the perimeter wherein each of the plurality of embedded antennas comprises a substrate, a first antenna radiator and a second antenna radiator. The substrate has a first surface and a second surface opposite the first surface, and further comprises a minor side and a major side. The first antenna radiator is disposed on the first surface and has a first length extending along the major side. The first length comprises a first minor radiator element and a second minor radiator element disposed on each terminal end of the first length. The second antenna radiator is disposed on the first surface and has a second length that is less than the first length. The first length and the second antenna radiator can be characterized as being in a parallel orientation.

In some embodiments, the MIMO antenna system further comprises a positive feeding line and a negative feeding line each extending from each of the plurality of embedded antennas into the clearance zone.

Generally, the MIMO antenna system may further comprise a system substrate further having a plurality of sides wherein each of the plurality of sides comprises a mirror antenna pair.

The third embodiment may further comprise a third antenna radiator and a fourth antenna radiator. The third antenna radiator is disposed on the second surface and is electrically coupled to the first antenna radiator by a first plurality of vias. The fourth antenna radiator is disposed on the second surface and is electrically coupled to the second antenna radiator by a second plurality of vias.

In some embodiments, each of the plurality of embedded antennas may further comprise one or more apertures disposed on the substrate.

In some embodiments, at least one of the one or more apertures may be disposed between the first and second antenna radiators.

In some embodiments, the substrate may further comprise a first half and a second half, wherein the second plurality of vias is disposed entirely on the first half.

Manufacturing

Generally, the substrate is a printed circuit board made of industry standard material such as FR4, Kapton or Pyralux with printed circuit design affixed thereto. Otherwise, the substrate can be fabricated in accordance with the level and knowledge of one having skill in the art. Other examples without limitation include more specialized materials such as Duroid, Taconic, and LDS.

The antenna radiator may be fabricated by etching the antenna element pattern in a metal trace bonded to an insulating dielectric substrate, such as a printed circuit board.

Each of the components of the embedded antenna and related system described herein may be manufactured and/or assembled in accordance with the conventional knowledge and level of a person having skill in the art.

While various details, features, combinations are described in the illustrated embodiments, one having skill in the art will appreciate a myriad of possible alternative combinations and arrangements of the features disclosed herein. As such, the descriptions are intended to be enabling only, and non-limiting. Instead, the spirit and scope of the invention is set forth in the appended claims.

First Illustrated Embodiment

FIG. 1 shows a top view of an embedded antenna (100) in accordance with a first illustrated embodiment. The embedded antenna comprises a substrate (110) having a first surface (111) and a second surface (not shown) opposite the first surface. Disposed on the first surface is a first antenna radiator (120) and a second antenna radiator (130). The first surface further comprises one or more apertures (160) which are disposed through the substrate to the second surface, thereby allowing air to occupy portions of the substrate for lowering the dielectric constant to improve antenna performance. The one or more apertures may comprise round holes, oblong slots, or other shapes. Apertures disposed between the first and second antenna radiators have a even greater effect of concentrating an electromagnetic field between the first and second antenna radiators.

The first antenna radiator (120) comprises a first length (121) disposed along a major side (114) of the substrate (110). A first minor radiator element (122) and a second minor radiator element (123) are each disposed at a terminal end (124) of the first length along a minor side (113) of the substrate. Both the first and second minor radiator elements each form a first angle (125) and a second angle (126) respectively with the first length. In a preferable embodiment, the first and second angle each comprise an angle at or close to ninety degrees to minimize additional footprint of the substrate. The first angle and second angle may comprise alternatively sized angles with the substrate being appropriately modified to compensate for any additional footprint required. Generally, the first antenna radiator comprises a negative resonator (127). The first antenna radiator further comprises first plurality of vias (141) configured to electrically couple the first antenna radiator with a third antenna radiator (not shown) disposed on the second surface. The first and third antenna radiators are coupled in such a way that an electrical signal point of view the first and third antenna radiators are a single antenna radiator.

The second antenna radiator (130) comprises a second length (131) such that the second length is less than the first length (121) of the first antenna radiator (120). The second antenna radiator is a monopole (132) and is generally a positive resonator (133). The second antenna radiator further comprises a second plurality of vias (151) configured to electrically couple the second antenna radiator with a fourth antenna radiator (not shown) disposed on the second surface. The second and fourth antenna radiators are coupled in such a way that an electrical signal would view the second and fourth antenna radiators as a single antenna radiator. In a preferable embodiment, the second antenna radiator and the first length of the first antenna radiator are in a parallel orientation to minimize interference with each other. The second antenna radiator as shown is disposed predominantly on a first half (115) such that the second plurality of vias are disposed entirely on the first half.

Figure 2:
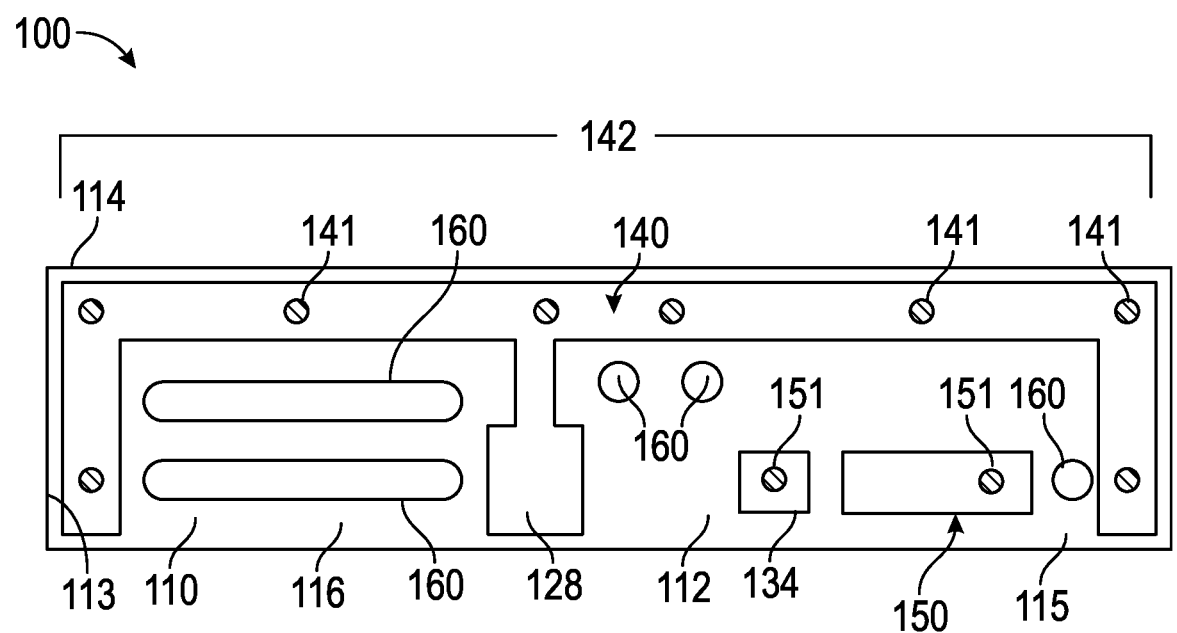
FIG. 2 shows a bottom view of the embedded antenna according to the first illustrated embodiment.

FIG. 2 shows a bottom view of the embedded antenna (100) according to the first illustrated embodiment. The embedded antenna comprises a substrate (110) having a first surface (not shown), and a second surface (112) opposite the first surface. Disposed on the second surface includes a third antenna radiator (140) and a fourth antenna radiator (150). The second surface further comprises one or more apertures which are disposed through the substrate and allow air to occupy for lowering the dielectric constant.

The third antenna radiator (140) comprises a footprint equal or similar to the first antenna radiator (120, FIG. 1). The third antenna radiator comprises a third length (142) which is disposed along a major side (114) of the substrate (110). The third antenna radiator further comprises a first plurality of vias (141) configured to electrically couple the third and first antenna radiators. Disposed near a middle portion of the third length is a negative mounting pad (128) which extends from the third antenna radiator in a direction parallel to a minor side (113) of the substrate. The negative mounting pad is configured to provide a ground connection.

Disposed near the fourth antenna radiator (150) is a positive mounting pad (134) such that both the fourth antenna radiator and the positive mounting pad comprise a second plurality of vias which are configured to electrically couple with the second antenna radiator (130, FIG. 1). Generally, the fourth antenna radiator comprises a length less than the second length (131, FIG. 1) due to the positive mounting pad.

In a preferable embodiment, the third antenna radiator (140) overlaps with the first antenna radiator (120, FIG. 1) almost entirely such that the third length (142) is equal to the first length (121, FIG. 1). Additionally, the fourth antenna radiator (150) overlaps with the second antenna radiator (130, FIG. 1).

Figure 3:
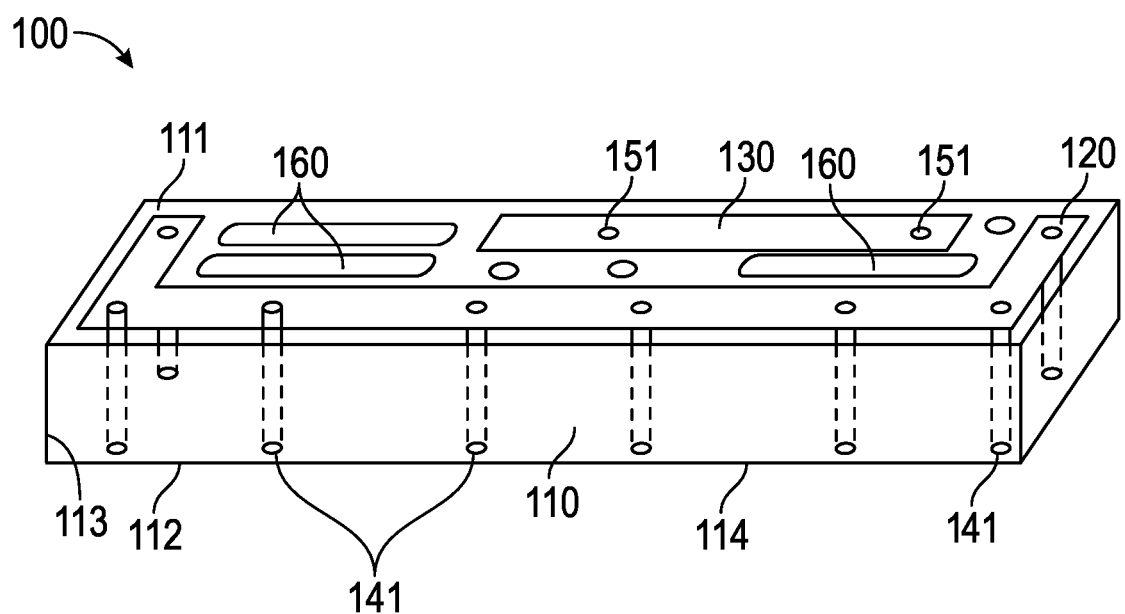
FIG. 3 shows a perspective view of the embedded antenna according to the first illustrated embodiment.

FIG. 3 shows a perspective view of the embedded antenna (100) according to the first illustrated embodiment. The embedded antenna comprises a substrate (110) having a first surface (111) and a second surface (112) opposite the first surface. The substrate further comprises a major side (114) and a minor side (113) orthogonal to the major side. The embedded antenna includes a first antenna radiator (120) and a second antenna radiator (130) each disposed on the first surface. The first antenna radiator includes a first plurality of vias (141) configured to electrically couple to a third antenna radiator (not shown) disposed on the second surface. Additionally, the second antenna radiator includes a second plurality of vias (151) configured to electrically couple to a fourth antenna radiator (not shown) disposed on the second surface. The embedded antenna further comprises one or more apertures (160) for lowering the dielectric constant.

Figure 4A:
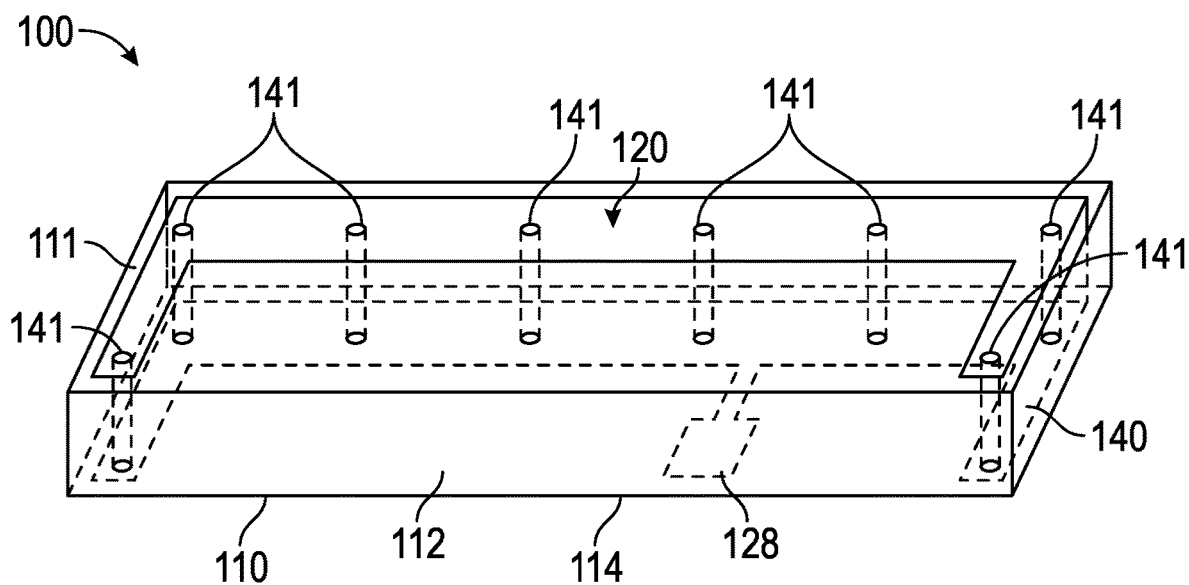
FIG. 4A shows a perspective view of a first and third antenna radiators disposed on an embedded antenna.

FIG. 4A shows a perspective view of a first (120) and third (140) antenna radiators disposed on an embedded antenna (100). The first antenna radiator is disposed on a first surface (111) of a substrate (110) and the third antenna radiator is disposed on a second surface (112) opposite the first surface. The first and third antenna radiators are electrically coupled by a first plurality of vias (141). A signal path may comprise beginning at a negative mounting pad (128) and traveling towards the third antenna radiator. The electrical signal can diverge to both left and right portions of the third antenna radiator, and upon reaching the first plurality of vias can travel up to the first surface and travel a similar path along the first antenna radiator as the signal path is traveling along the third antenna radiator. One having skill in the art will appreciate due to on offset of the negative mounting pad, the left portion is greater than the right portion.

Figure 4B:
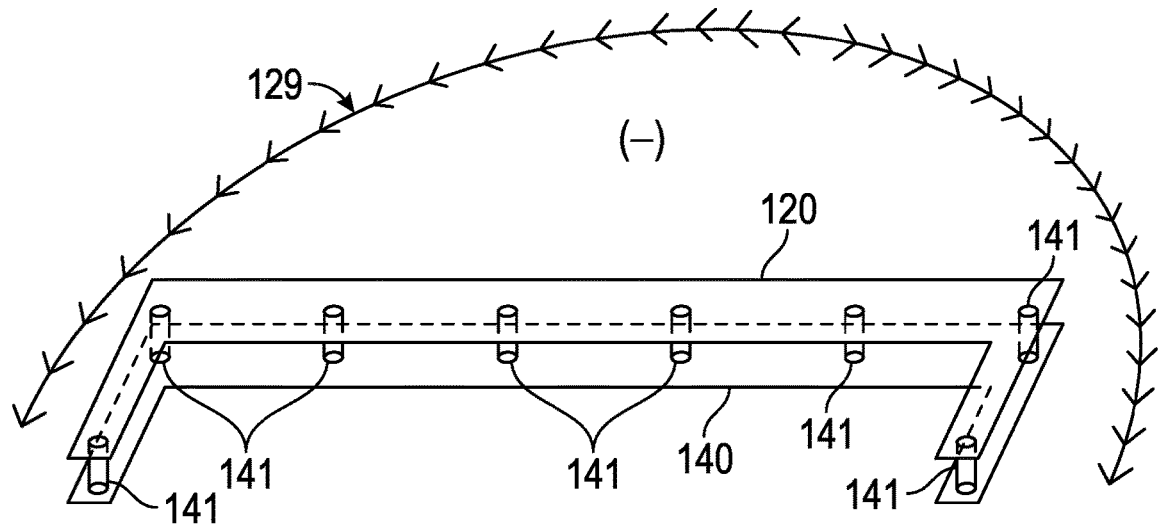
FIG. 4B shows a first current distribution of the first and third antenna radiators.

FIG. 4B shows a first current distribution (129) of the first (120) and third (140) antenna radiators. Due to an offset of the negative mounting pad (128, FIG. 4A), arrows displaying the first current distribution are not symmetrical and are more abundant at the left side. Both shape and direction of the first current distribution are a result of the shape and orientation of the first and third antenna radiators. The direction of the first current distribution can be characterized as being parallel to both first and second surfaces (111; 112, FIG. 4A).

Figure 5A:
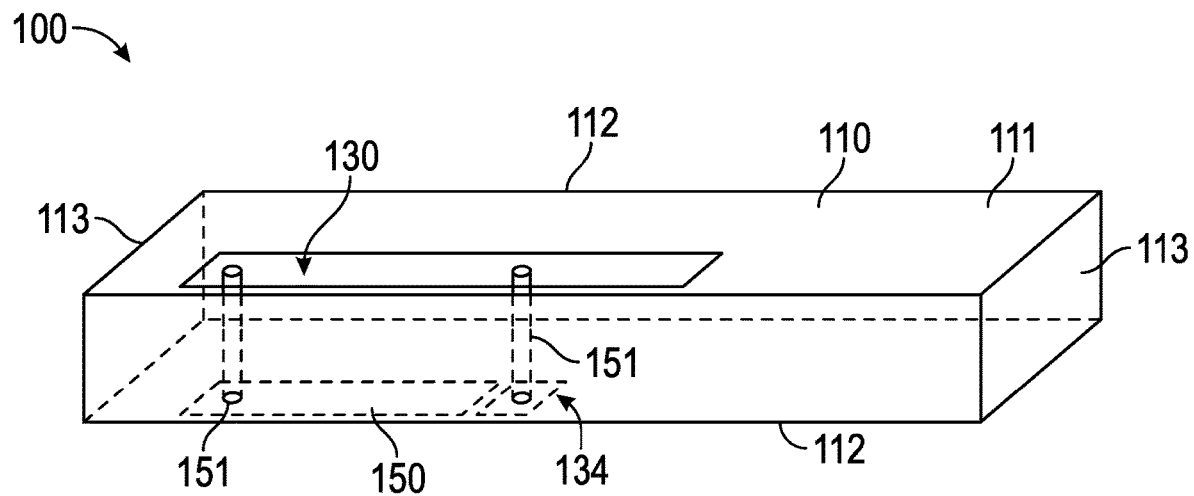
FIG. 5A shows a perspective view of a second and fourth antenna radiators disposed on an embedded antenna.

FIG. 5A shows a perspective view of a second (130) and fourth (150) antenna radiators disposed on an embedded antenna (100). Both the second and fourth antenna radiators are disposed along a major side (114) of a substrate (110). The second antenna radiator is disposed on a first surface (111) and the fourth antenna radiator is disposed on a second surface (112) opposite the first surface, wherein the second and fourth radiators are electrically coupled by a second plurality of vias (151). A signal path may comprise beginning at a positive mounting pad (134) disposed on the second surface and can travel upward through at least one of the second plurality of vias. Upon reaching the first surface, the signal may diverge in either direction of the second antenna radiator towards opposing minor sides (113) of the substrate. A signal which travels towards additional vias of the second plurality of vias will then subsequently travel downwards through the substrate to the fourth antenna radiator at the second surface.

Figure 5B:
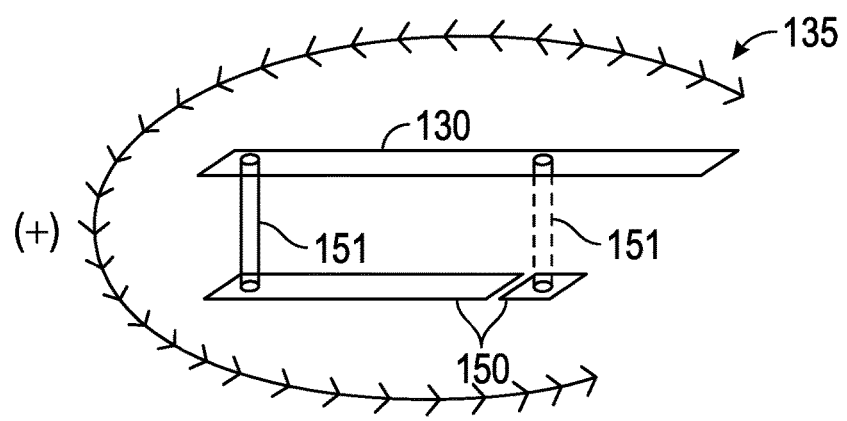
FIG. 5B shows a second current distribution of the second and fourth antenna radiators.

FIG. 5B shows a second current distribution (135) of the second (130) and fourth (150) antenna radiators. Both shape and direction of the second current distribution are a result of the shape and orientation of the second and fourth antenna radiators. The direction of the second current distribution can be characterized as being orthogonal to first and second surfaces (111; 112, FIG. 4A).

Figure 6:
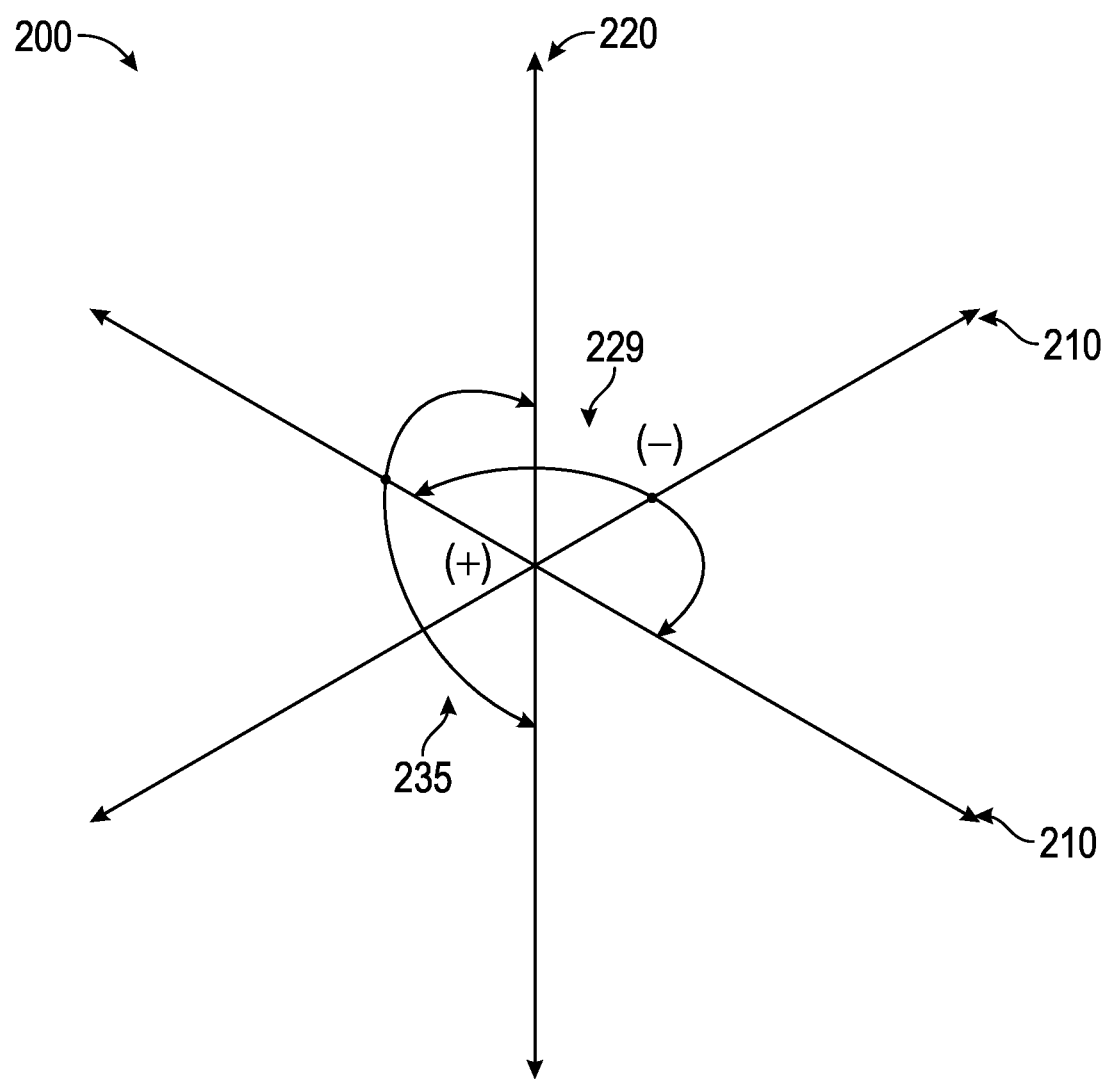
FIG. 6 shows a graphical representation of the first and second current distributions.

FIG. 6 shows a graphical representation (200) of the first (229) and second (235) current distributions. The graphical representation comprises a horizontal plane (210) and a vertical axis (220). As shown, the first current distribution lies completely on the horizontal plane. The second current distribution endpoints both intersect the vertical axis with a zenith intersecting an axis of the horizontal plane. In such a configuration, the first and second current distributions are characterized as being in an orthogonal orientation which maximizes reduction of interference.

Second Illustrated Embodiment

Figure 7B:
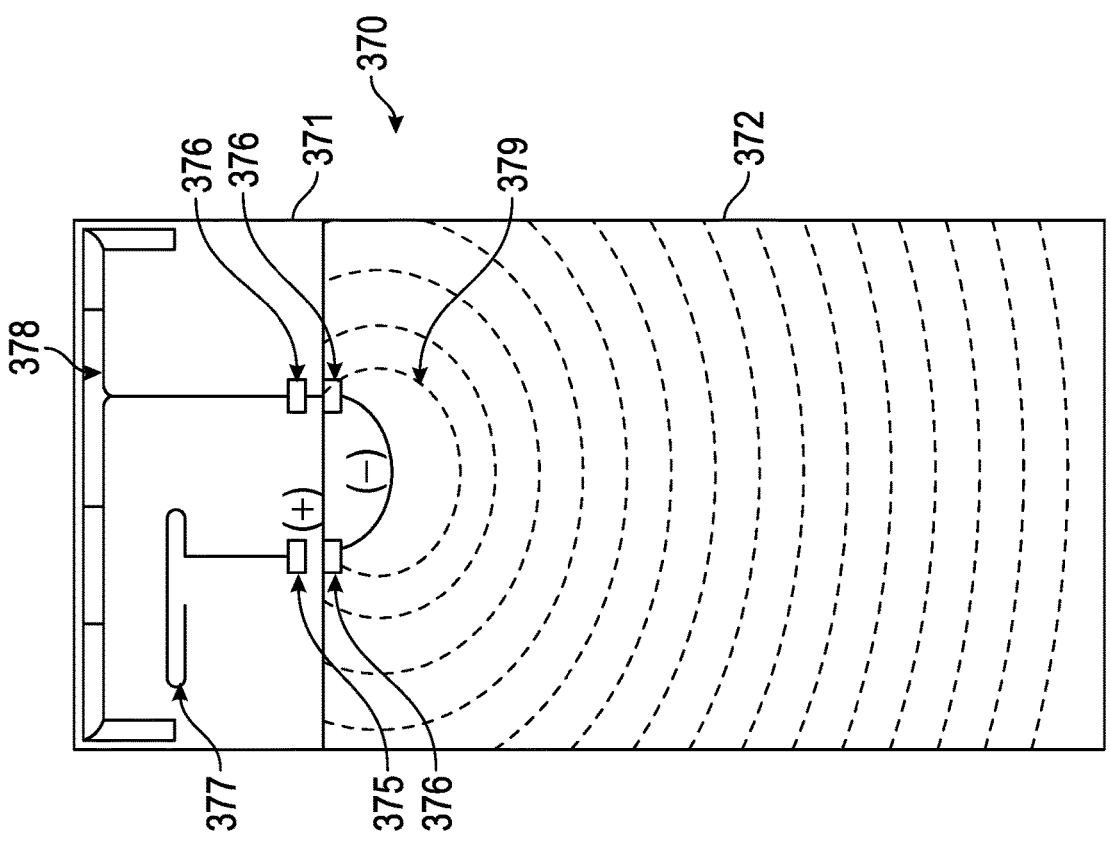
FIG. 7B shows a top view of the embedded antenna integrated with the mounting circuit board representing current distributions according to the second illustrated embodiment.
Figure 7A:
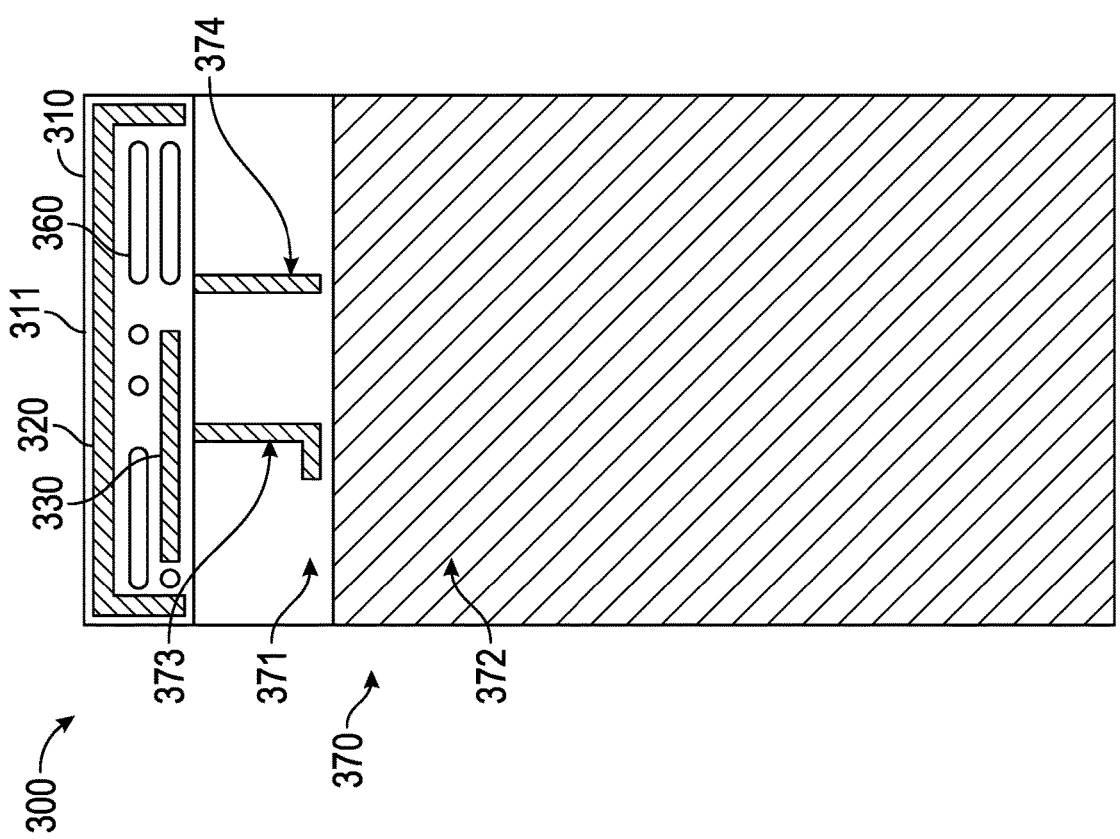
FIG. 7A shows a top view of an embedded antenna integrated with a mounting circuit board in accordance with a second illustrated embodiment.

FIG. 7A shows a top view of an embedded antenna (300) integrated with a mounting circuit board (370) in accordance with a second illustrated embodiment. The embedded antenna comprises a substrate (310) having a first antenna radiator (320) and second antenna radiator (330) disposed on a first surface (311). A second surface (not shown) opposite the first surface is coupled to the mounting circuit board. The mounting circuit board comprises a clearance zone (371) and a ground plane (372) wherein the clearance zone is disposed between the ground plane and a surface of the mounting circuit board coupled to the embedded antenna. The clearance zone includes a positive feed (373) configured to couple with a positive mounting pad (134, FIG. 5A) of the embedded antenna, and a negative feed (374) configured to couple with a negative mounting pad (128, FIG. 4A) of the embedded antenna. One with skill in the art will appreciate that the positive feed and negative feed are in an orthogonal orientation. Upon coupling of the mounting circuit board with the embedded antenna, the first antenna radiator (ie negative resonator) is enhanced for maximum efficiency. Both the positive and negative feeds may be constructed by transmission lines in addition to any components for fine tuning the embedded antenna.

FIG. 7B shows a top view of the embedded antenna (300) integrated with the mounting circuit board (370) representing current distributions according to the second illustrated embodiment. The mounting circuit board comprises a clearance zone (371) and a ground plane (372). The clearance zone comprises a positive feed pad (375) and a negative feed pad (376). Both the positive and negative feed pads may be populated with 0 Ohm resistors or any fine-tuning elements known to one having skill in the art for optimizing antenna performance. Positive current distribution (377) and negative current distribution (378) are each represented on a 2D plane of the clearance zone. Shown on the ground plane is a ground current distribution (379) which can assist with lower frequencies on a spectrum of the embedded antenna.

Third Illustrated Embodiment

Figure 8:
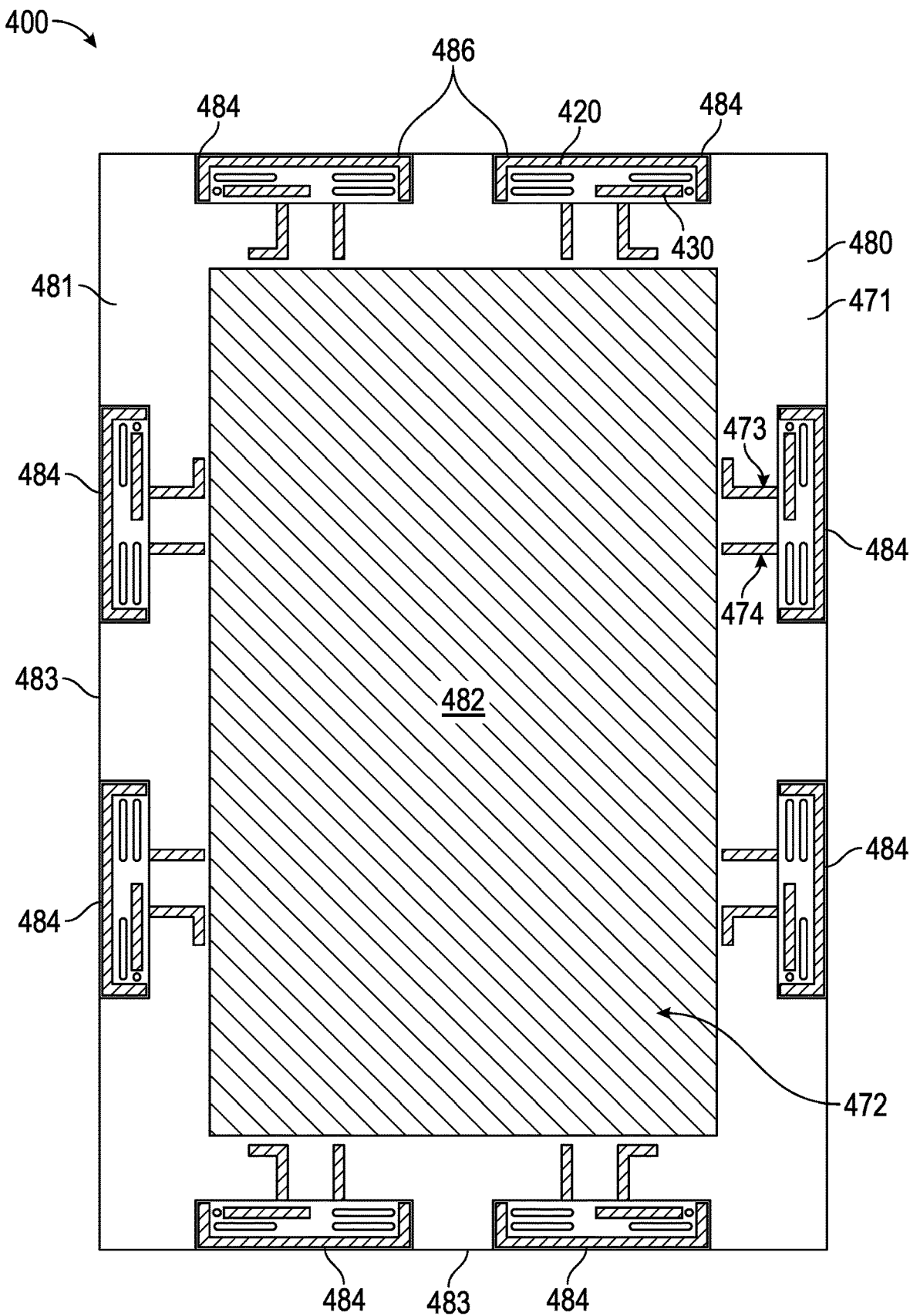
FIG. 8 shows a top view of a MIMO antenna system in accordance with a third illustrated embodiment.

FIG. 8 shows a top view of a MIMO antenna system (400) in accordance with a third illustrated embodiment. The MIMO antenna system comprises system substrate (480) having a center portion (482) and a perimeter (481) surrounding the center portion. The center portion comprises a ground plane (472) and the perimeter comprises a clearance zone (472) in addition to a plurality of embedded antennas (484). The system substrate comprises a plurality of sides (483) such that at each of the plurality of sides is a mirrored antenna pair (486) of embedded antennas. Each of the plurality embedded antennas comprises a first antenna radiator (420) and a second antenna radiator (430). Extending from each of the plurality of embedded antennas towards the ground plane is a positive feed (473) and a negative feed (474).

As shown, the mirrored antenna pairs (486) comprise two embedded antennas such that the second antenna radiator (430) of each embedded antenna is positioned closest to a nearby corner of the system substrate (480). In alternative embodiments, the mirrored antenna pairs can be flipped such each of the second antenna radiators is positioned inwardly close to one another.

FEATURE LIST embedded antenna (100; 300)
substrate (110; 310)
first surface (111; 311)
second surface (112)
minor side (113)
major side (114)
first half (115)
second half (116)
first antenna radiator (120; 320; 420)
first length (121)
first minor radiator element (122)
second minor radiator element (123)
terminal end (124)
first angle (125)
second angle (126)
negative resonator (127)
negative mounting pad (128)
first current distribution (129; 229)
second antenna radiator (130; 330; 430)
second length (131)
monopole (132)
positive radiator (133)
positive mounting pad (134)
second current distribution (135; 235)
third antenna radiator (140)
first plurality of vias (141)
third length (142)
fourth antenna radiator (150)
second plurality of vias (151)
one or more apertures (160; 360)
graphical representation (200)
horizontal plane (210)
vertical axis (220)
mounting circuit board (370)
clearance zone: (371; 471)
ground plane: (372; 472)
positive feed (373; 473)
negative feed (374; 474)
positive feed pad (375)
negative feed pad (376)
positive current distribution (377)
negative current distribution (378)
ground current distribution (379)
MIMO antenna system (400)
system substrate (480)
perimeter (481)
center portion (482)
plurality of sides (483)
plurality of embedded antennas (484)
mirrored antenna pair (486)

What is claimed is:

1. An embedded antenna, comprising:
a substrate having a first surface and a second surface opposite the first surface,
the substrate further comprising a minor side and a major side;
a first antenna radiator disposed on the first surface,
the first antenna radiator having a first length extending along the major side, said first length comprising a first minor radiator element and a second minor radiator element disposed on each terminal end of the first length;
a second antenna radiator disposed on the first surface,
the second antenna radiator having a second length wherein the second length is less than the first length;
a third antenna radiator disposed on the second surface,
the third antenna radiator and the first antenna radiator being electrically coupled by a first plurality of vias; and
a fourth antenna radiator disposed on the second surface,
the fourth antenna radiator and the second antenna radiator being electrically coupled by a second plurality of vias;
wherein the first length and the second antenna radiator comprise a parallel orientation.

2. The embedded antenna of claim 1, further comprising one or more apertures disposed on the substrate.

3. The embedded antenna of claim 2, wherein at least one of the one or more apertures is disposed between the first and second antenna radiators.

4. The embedded antenna of claim 1, further comprising a mounting circuit board coupled to the second surface, the mounting circuit board comprising a clearance zone and a ground plane wherein the clearance zone is disposed between the embedded antenna and the ground plane.

5. The embedded antenna of claim 1, the substrate further comprising a first half and a second half, wherein the second plurality of vias is disposed entirely on the first half.

6. An embedded antenna, comprising:
a substrate having a first surface and a second surface opposite the first surface,
the substrate further comprising a minor side and a major side;
a first antenna radiator disposed on the first surface,
the first antenna radiator having a first length extending along the major side, said first length comprising a first minor radiator element and a second minor radiator element disposed on each terminal end of the first length; and
a second antenna radiator disposed on the first surface,
the second antenna radiator having a second length wherein the second length is less than the first length;
wherein the first length and the second antenna radiator comprise a parallel orientation.

7. The embedded antenna of claim 6, further comprising:
a third antenna radiator disposed on the second surface,
the third antenna radiator and the first antenna radiator being electrically coupled by a first plurality of vias; and
a fourth antenna radiator disposed on the second surface,
the fourth antenna radiator and the second antenna radiator being electrically coupled by a second plurality of vias.

8. The embedded antenna of claim 7, the substrate further comprising a first half and a second half, wherein the second plurality of vias is disposed entirely on the first half.

9. The embedded antenna of claim 6, further comprising one or more apertures disposed on the substrate.

10. The embedded antenna of claim 9, wherein at least one of the one or more apertures is disposed between the first and second antenna radiators.

11. The embedded antenna of claim 6, further comprising a mounting circuit board coupled to the second surface, the mounting circuit board comprising a clearance zone and a ground plane wherein the clearance zone is disposed between the embedded antenna and the ground plane.

12. A MIMO antenna system, comprising:
a system substrate comprising a perimeter and a center portion,
the perimeter comprises a clearance zone and the center portion comprises a ground plane; and
a plurality of embedded antennas disposed along the perimeter,
wherein each of the plurality of embedded antennas comprises:
a substrate having a first surface and a second surface opposite the first surface,
the substrate further comprising a minor side and a major side,
a first antenna radiator disposed on the first surface,
the first antenna radiator having a first length extending along the major side, said first length comprising a first minor radiator element and a second minor radiator element disposed on each terminal end of the first length, and
a second antenna radiator disposed on the first surface,
the second antenna radiator having a second length wherein the second length is less than the first length,
wherein the first length and the second antenna radiator comprise a parallel orientation.

13. The MIMO antenna system of claim 12, further comprising a positive feeding line and a negative feeding line each extending from each of the plurality of embedded antennas into the clearance zone.

14. The MIMO antenna system of claim 12, the system substrate further comprising a plurality of sides wherein each of the plurality of sides comprises a mirror antenna pair.

15. The MIMO antenna system of claim 12, each of the plurality of embedded antennas further comprising:
a third antenna radiator disposed on the second surface,
the third antenna radiator and the first antenna radiator being electrically coupled by a first plurality of vias; and
a fourth antenna radiator disposed on the second surface,
the fourth antenna radiator and the second antenna radiator being electrically coupled by a second plurality of vias.

16. The MIMO antenna system of claim 12, each of the plurality of embedded antennas further comprising one or more apertures disposed on the substrate.

17. The MIMO antenna system of claim 16, wherein at least one of the one or more apertures is disposed between the first and second antenna radiators.

18. The MIMO antenna system of claim 15, the substrate further comprising a first half and a second half, wherein the second plurality of vias is disposed entirely on the first half.

* * * * *